April 3, 1945.　　　D. S. ELLIOTT　　　2,372,939
TRANSPARENT NOSE TURRET
Filed July 3, 1942　　　2 Sheets-Sheet 1
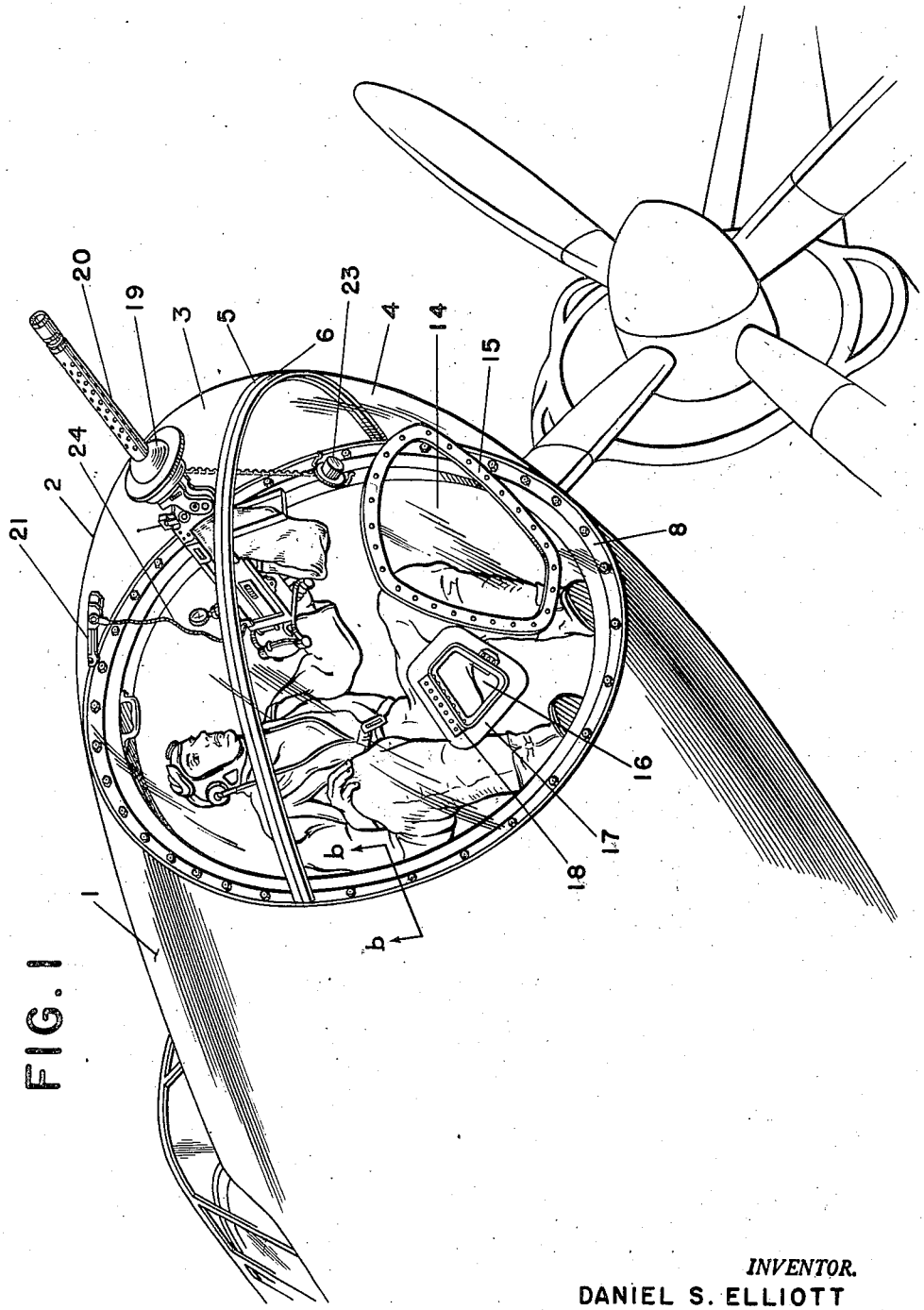
INVENTOR.
DANIEL S. ELLIOTT
BY
George Douglas Jones
ATTORNEY April 3, 1945. D. S. ELLIOTT 2,372,939
TRANSPARENT NOSE TURRET
Filed July 3, 1942 2 Sheets-Sheet 2
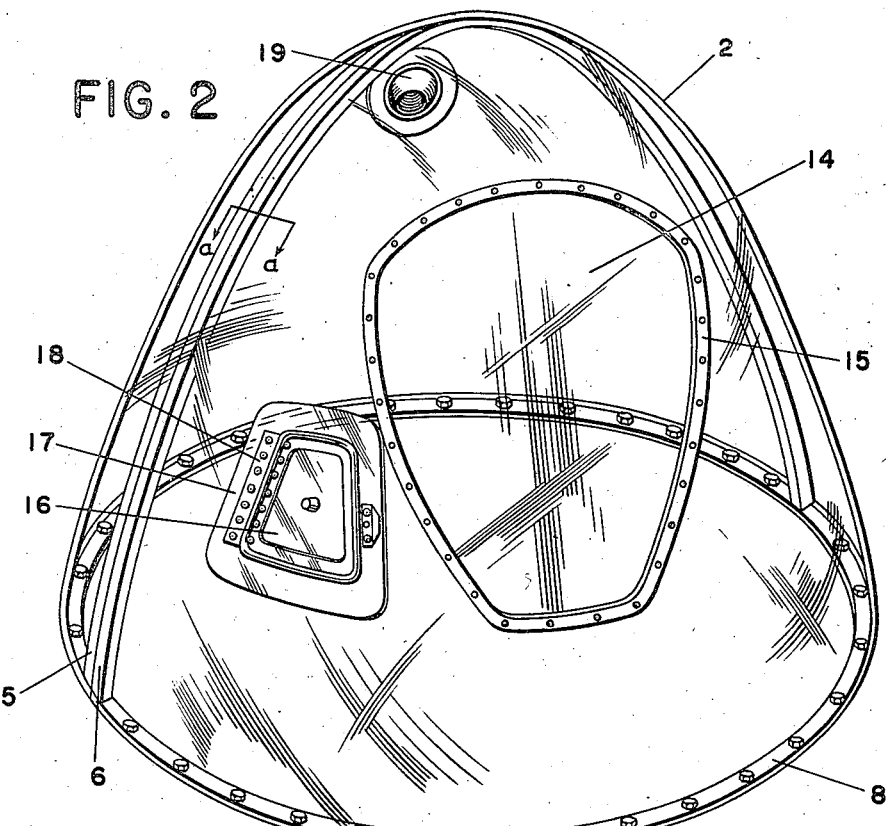
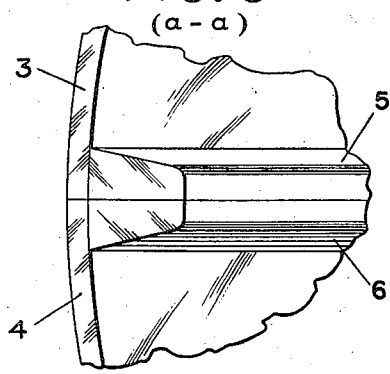
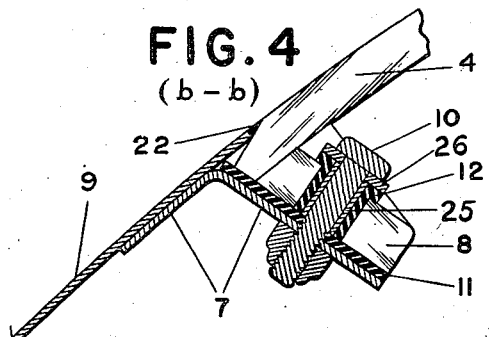
INVENTOR.
DANIEL S. ELLIOTT
BY
ATTORNEY Patented Apr. 3, 1945

2,372,939

UNITED STATES PATENT OFFICE 2,372,939

TRANSPARENT NOSE TURRET

Daniel S. Elliott, Middle River, Md., assignor to The Glenn L. Martin Company, Middle River, Md., a corporation of Maryland Application July 3, 1942, Serial No. 449,553

5 Claims. (Cl. 89—37.5)

This invention relates to a novel airplane fuselage structure.

The requirements of a present day medium bomber call for a maximum of fighting power, speed and maneuverability. To meet these requirements, drag and weight must be kept to a minimum.

Among the essentials of a medium bomber are gun turrets by means of which pursuit ships may be fought off. There are usually forwardly and rearwardly directed turrets and one or more adapted to fire to the sides of the craft.

The problem which this invention solves is that of providing a forwardly directed turret which affords maximum visibility for fighting and bombing and which at the same time preserves the streamlined contour of the fuselage of the bomber to avoid the increased drag, inherent in other nose turrets.

The turret or nose structure of this invention may be formed of any transparent plastic material having the required mechanical strength and optical properties. The material best suited to the purpose is known as "plexiglas," the acrylic plastic now most widely used in aircraft and actually more transparent than glass. It is less than half the weight of glass and yet will withstand two to three times the impact. It retains its transparent qualities in extremes of temperature and humidity. It can easily be drilled or sawed and since it is a thermoplastic, sheets of the material can readily be formed over wooden forms into complete curved surfaces.

This acrylic plastic can readily be formed by heating cast sheets to a temperature of 220-250° F., placing them over forms of wood, metal, or plaster covered with flannel or felt to eliminate rough surfaces and holding them in place by clamps until cooled.

A further property of this plastic which makes it admirably suited for the purpose, is that reinforcing members, cut from the plastic may be joined to the sheets by solvency cementing. Such a bond gives a strength equal to an integral structure and the visibility is practically unimpaired by the reinforcing members.

Further objects of the invention will become apparent from the description of the accompanying drawings, which form a part of the disclosure and in which like numerals refer to like parts. It is to be understood that certain modifications, alterations and substitutions may be made without departing from the spirit and scope of the appended claims.

In the drawings:

Fig. 1 is a perspective view of the nose of the fuselage of a medium bomber embodying the invention.

Fig. 2 is a perspective view of the plastic nose portion.

Fig. 3 shows the reinforcing members at the abutting edges of the sections of the nose.

Fig. 4 shows the mounting means for the nose on the transverse rib of the fuselage.

Referring to the drawings, Fig. 1, shows a fuselage 1, having the nose portion 2, made of a transparent plastic material. This transparent plastic nose is made from two sheets of the formed plastic 3 and 4, having reinforcing ribs 5 and 6 solvency cemented to the abutting edges of the sheets. Ribs 5 and 6 may, of course, be formed integrally with sheets 3 and 4. The abutting edges of the sheets and reinforcing members of the two portions of the plastic nose are solvency cemented together to form a unitary nose structure.

The nose of the design disclosed, is substantially parabolic in shape and approximately circular where it joins the transverse rib 7 of the fuselage. A rib member 8 cut out of a sheet of the plastic material, is cemented to the inner periphery of the end of the nose portion to form an attaching flange to the rib member 7 of the fuselage.

Due to the fact that the metal parts of the fuselage have a different coefficient of expansion from the plastic nose, a mounting such as shown in Fig. 4 is necessary. The transverse rib 7 is attached to the skin 9. The mounting flange 8 of the nose portion is attached to the rib 7 by bolts 10. An annular gasket spaces the members 8 and 7. Flanged tubular gaskets 12 space the bolt assembly from the flange 8. Sleeve 25 and washer 26 may be used to afford additional bearing surface around bolt 10. The gaskets 11 and 12 are made from pliable, resilient material, such as rubber or rubber substitutes. Thus, the plastic nose mounting flange and metal fuselage, to which it is attached, may expand and contract with changes in temperature while maintaining the parts in a strong and sealed relationship.

In the section shown in Fig. 4, the skin 9 extends a little forward of the rib 7. The outer surface of the nose and the skin 9 are in the same plane. A sealing compound 22 may be employed to make the joint complete and smooth.

The window 14 is flush mounted in frame 15 which may be of cemented plastic construction or a light aluminum frame. The window 14 and frame 15 are separated by a resilient member similar to members 11 and 12. The window 14 is usually of optically plane plate glass to minimize errors in the use of the bombsight.

Closure 16 mounted in frame 17 is hinged at 18, and affords an access door for cleaning the bombardier's window 14 from within the enclosure. The closure 16 and frame 17 are of the same transparent plastic material.

In the upper section of the plastic nose adjacent the tip of the nose, a flanged ball and socket joint 19 afford a gun mount for 50 caliber machine gun 20. The plug 23 closes the opening if the gun is dismounted. The gun 20 is shown in its operative position in Fig. 1 but, when the gunner assumes the role of bombardier, the gun is stowed by securing the stock to a suitable bracket 21. The cable 24 limits the downward motion of the stock. The center of gravity of the gun is well within the compartment from the mounting socket 19 and therefore easily maneuvered by the gunner and experiences very little whip due to the air stream.

The structure disclosed thus affords a nose turret nearly perfect from aerodynamic consideration. There is substantially a hemisphere of unobstructed vision. The construction and arrangement affords a convenient arrangement of armament so that the nose is a combined gunner turret and bombardier station. The rugged construction of the plastic reinforced, plastic shell permits the mounting of a 50 caliber machine gun directly on the shell without the necessity of vision-obstructing mounting braces.

I claim as my invention:

1. A generally parabolic transparent plastic nose for the leading end of an airplane fuselage providing a hemisphere of substantially unobstructed vision, consisting of a plurality of sections formed from transparent thermoplastic sheets, the edges of the sheets abutting and directly secured to each other by solvency cementing and having a preformed rib member of the same material secured thereto by solvency cementing, to form a unitary generally parabolic nose structure, a generally circular preformed rib of the same material solvency cemented to the periphery of the open end of the plastic nose to form an internal mounting flange.

2. A transparent plastic nose member for attachment to the forward end of a fuselage, said nose member conforming with and completing the contour of the forward portion of the fuselage to form a streamlined body, said nose being formed of said plastic members having its sole reinforcing means formed of transparent plastic members and solvency cemented thereto to afford maximum visibility.

3. In combination with a transparent plastic nose member for attachment to the forward end of the fuselage and having sole reinforcing means formed of transparent plastic members to afford maximum visibility, a bombardier's window of optically plane glass secured in a cut out portion on the lower side of the nose member and a transparent access door in said plastic nose member adjacent bombardier's window to afford means for cleaning said window.

4. A transparent plastic nose for an airplane fuselage providing a hemisphere of substantially unobstructed vision, comprising a plurality of sections formed from transparent plastic sheets, said sheets having flanges formed on their edges, and the edges of the open end, said flanges abutting each other and solvency cemented together to form a unitary nose structure and said flanges at the periphery of the open end formed to afford mounting means for the nose on the fuselage.

5. In combination with a transparent plastic nose member for attachment to the forward end of the fuselage and having sole reinforcing means formed of transparent plastic members to afford maximum visibility, a bombardier's window of optically plane glass secured in a cut out portion on the lower side of the nose member.

DANIEL S. ELLIOTT.